Dec. 4, 1951  R. J. BETHANCOURT  2,577,599
SHOCKPROOF CASE FOR BOREHOLE MEASURING INSTRUMENTS

Filed Aug. 3, 1948

INVENTOR.
RAOUL J. BETHANCOURT
BY
ATTORNEYS

Patented Dec. 4, 1951

2,577,599

UNITED STATES PATENT OFFICE 2,577,599

SHOCKPROOF CASE FOR BOREHOLE MEASURING INSTRUMENTS

Raoul J. Bethancourt, Corpus Christi, Tex., assignor to Sun Oil Company, Philadelphia, Pa., a corporation of New Jersey Application August 3, 1948, Serial No. 42,226

3 Claims. (Cl. 73—151)

This invention relates, in general, to well bore measuring instruments and more particularly to housings for such instruments which will protect the accuracy and functions of the measuring devices by absorbing shock experienced in measuring operations.

From time to time during the period of drilling well boreholes and the extraction of crude petroleum from the earth, it is required to measure and record temperatures, pressures and other conditions existing at different levels within the earth. Instruments have been devised which measure and record these conditions on charts which are marked mechanically. The accuracy of the records is dependent upon maintaining the mechanically operating mechanism in good repair and continuous regulated movement during the measuring and recording period. A sharp blow to the casing will halt the operation of the activating mechanism or completely stop it requiring expensive repairs and loss of time. It is a principal object of this invention to disclose a shock absorbing housing for instruments of this type to insure continuity of operations and reduce the costs for expensive repairs.

Another object is to disclose a housing for measuring and recording instruments to be lowered into boreholes which will absorb both longitudinal and lateral shocks thereby meeting all the operational blows to which the instrument would be subjected.

A further object is to disclose shock absorbing features which will prevent undue wear on the instrument case as it is lowered and raised within the tubing in the borehole through which it is passed.

Yet another object is to disclose an instrument housing to be suspended by a wire line which will absorb the shocks imparted to the suspending line as it is lowered and raised, and also reduce the shearing action on the line to which it is attached.

These and other objects will be evident from a detailed description of the device, in which the drawings illustrate the various components, as follows.

Figure 1:
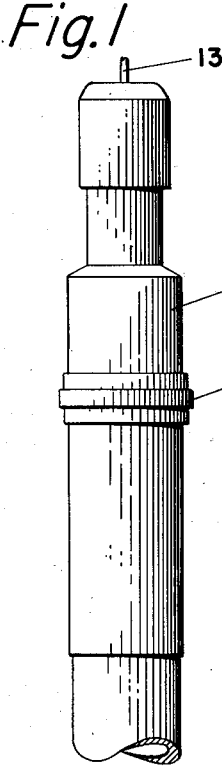
Figure 1 shows the complete assembly of the instrument housing.

In Figure 1, the assembled housing 10, nose plug 11 and tail plug 12, are shown as they would appear before being lowered into a well borehole. The housing 10 is hollow so that the measuring and recording device, for example, the E. L. I. Humble type Recording Pressure Gauge, may be enclosed. The assembled housing, as shown in this figure, is suspended by a wire line 13 which is fastened in the tail plug assembly 12.

Figure 2:
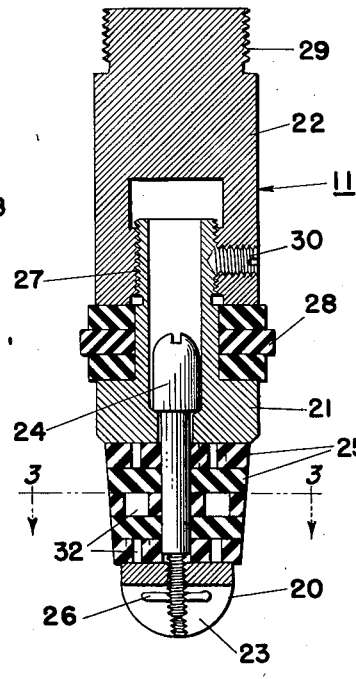
Figure 2 is a sectional elevation view of the shock-absorbing nose plug.

The shock-absorbing nose plug 11 is shown in cross-section detail in Figure 2. For operating purposes the nose plug assembly, generally indicated by the numeral 11, is divided into three major parts, a metallic nose 20, a shock-absorbing member or section 21, and a connector 22. The metallic nose 20 is slotted as at 23 (Figure 1) and shown by the cross-section detail in this Figure 2. A pin 24, threaded at the lower end where it enters the nose piece 20, connects the nose piece to the shock-absorbing member 21. It will be evident that pin 24 is retractable into the body of member 21 thereby transmitting vertical shock to resilient disks generally indicated at 25 which surround pin 24 in close fitting engagement. A fastener 26, such as a cotter pin, is attached to the lower part of the threaded section of pin 24 to prevent the metallic nose 20 from being lost in the well borehole. The connector section 22 of the nose plug assembly is threaded at 27 to engage the shock-absorber member 21 above the resilient washers 28, compressing them into firm position on the member 21. A threaded section 29 on the upper end of the connector 22 is arranged to be received into the instrument housing 10 of Figure 1 and thus connects the nose plug assembly 11 to the hollow instrument space. A set screw 30 secures the connector 22 and shock-absorbing member 21 together during operations.

Figure 3:
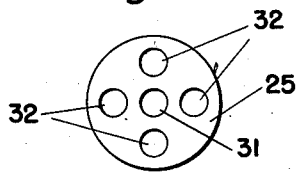
Figure 3 is a cross-section on line 3—3 of Figure 2.

The resilient disks 25 placed between the metallic nose piece 20 and the shock absorbing member 21 are preferably formed of neoprene rubber gasket material in which a section of cotton fabric is embedded to procure long wearing qualities together with considerable resilience. This description is not intended to restrict the shock absorbing disks to this particular material, as any resilient, shock-absorbing agency may be used. The periphery of the disks 25 are tapered from the approximate diameter of the metallic nose piece 20 to the larger diameter of the shock-absorbing member 21. An additional feature of the design of the disks 25 is shown in the cross-section view Figure 3, where the central hole 31 for registering on the pin 24 is shown surrounded with a series of holes or slots 32 of either regular or irregular area. The reasons for making the resilient disks in this manner will be fully understood later in the discussion of the operation.

The lateral shock-absorbing material indicated here as three resilient washers 28 are preferably formed of a neoprene rubber with embedded cotton fabric although other shock-absorbing materials may well be used. There is a difference in diameter between the middle washer and the two outer washers which lends to the effectiveness of the shock-absorbing qualities. These washers are preferably solid except for the center hole used in mounting them on the shock-absorbing member 21, although they, too, may have holes or slots as described for the resilient disks 25 if desirable.

Figure 4:
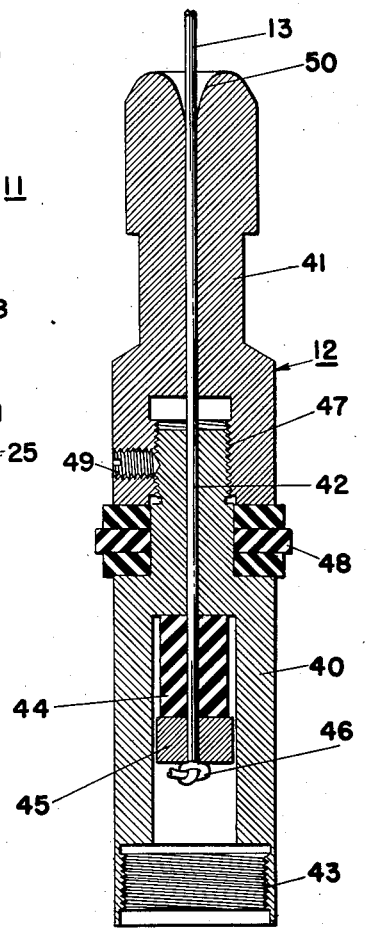
Figure 4 is a sectional elevation view of the shock-absorbing tail plug.

Figure 4 shows a preferred embodiment of the shock-absorbing tail plug 12 which comprises a shock-absorbing member or section 40 and a connector 41. Both these members are apertured longitudinally and concentrically at 42 to receive the suspending line 13. The shock-absorbing member 40 is threaded at 43 to engage the upper end of housing 10 (Figure 1). The aperture 42 within the lower part of the shock-absorbing member 40 is enlarged to hold a resilient sleeve 44 of a fabric embedded neoprene as described above or other equally resilient material. A metallic washer 45 is anchored to the bottom of suspending line 13 as by a knot in the line or other latching device shown at 46. The connector 41 is threaded at 47 to receive the shock-absorbing member 40 and is arranged to secure resilient washers 48 on the body of the member 40 similar to the arrangement used on the nose plug assembly 11 previously described. These washers are of similar material used on the nose plug and may be slotted or not as desired and fully described above. A set screw 49 is let into the side of the connector member 41 to insure the parts remaining together under operating conditions as noted above in relation to the description of the nose plug.

In discussing the operation, reference is made to all the figures previously described. It will be understood that the shock-absorbing housing herein disclosed may be used with many forms of instruments now used, or which may later be adapted for borehole measurements, and that no claim is made here for any particular kind or type of measuring device. With this in mind it will be sufficient to say that the instrument to be lowered into the well is made ready and placed within the instrument housing 10. This is usually done after the nose plug assembly 11 has been coupled to the housing 10 thereby closing the lower end. Line 13 is secured within the tail plug assembly so that the metal washer 45 is held securely against the resilient sleeve 44 by a fastening device 46 in the end of the line. The tail plug 12 is then threaded on housing 10 and the instrument casing is ready to be lowered into the drill tubing.

As the instrument housing is lowered down the tubing the lateral shock absorbers in the nose and tail plugs, numbers 28 and 48 respectively, keep the casing aligned and absorb lateral shock as the housing swings from side to side. The difference in the diameters of the resilient washers permits the vertical shock to be partially absorbed and distributed before the washers of lesser diameter are brought into contact. The operational vertical shocks caused by the weight of the housing and instrument on the line are absorbed by the resilient sleeve 44 (Figure 4) which cushions the sudden jars throughout the case incident to raising or lowering.

As the housing passes downward in the tubing, side obstructions projecting sufficiently far outward and sudden jolts caused by dropping the housing on the nose piece 20 (Figure 2) are absorbed by the tapered and slotted resilient disks 25. The metallic nose piece striking an obstacle transmits the jar to pin 24 which moves upward into shock-absorbing member 21 permitting the shock to be absorbed by resilient disks 25. The series of resilient disks 25 are described above as tapered and slotted (Figures 2 and 3) thereby disbursing the large unit force received by the metallic nose piece into increasingly smaller force units as the shock is absorbed by successive tapered and slotted disks.

The lateral and vertical shocks which occur in operating the described instrument housing cause considerable movement and resulting wear on suspending line 13. Existing tail plugs are designed to present a straight shoulder to the suspending line where it exits from the tail plug assembly. To correct this wear and permit the repeated movement of the housing as the lateral and vertical shocks are absorbed, the tail plug connector 41 is flared at the exit point 50 of line 13.

The preferred embodiment of a shock-absorbing instrument housing has been disclosed, illustrating the device with simple, easily procured materials. Many substitutions of the elements as here disclosed are possible without avoiding the spirit of the invention. It is intended, therefore, that this disclosure will include such equivalents and is limited only by the appended claims.

I claim:

1. A shock-absorbing housing for instruments used in measuring and recording borehole information in well drilling operations adapted to be suspended by a wire line comprising, in combination: a tubular chamber constructed to receive and enclose said instruments; a nose plug divided into shock-absorbing and connector members detachably attachable to the lower end of said chamber, said shock-absorbing member including a metallic nose piece, a plurality of slotted resilient disks above said nose piece to absorb vertical shock, a metallic body section above and adjacent said resilient disks, a longitudinally movable pin centrally disposed in said body section and through said resilient disks connecting said nose piece to the body member in alignment therewith, a plurality of resilient rings of a diameter larger than said body section compressed between the shock-absorbing and connector members to absorb lateral shock, and the connector member constructed to attach said shock-absorbing member to the instrument chamber; a tail plug longitudinally and concentrically apertured to receive said suspending line and divided into shock-absorbing and retainer members detachably attachable to the upper end of said chamber, a resilient sleeve within the suspending line aperture of the shock-absorbing member enclosing the suspending line and adapted to absorb vertical operating shocks, a plurality of resilient rings of a diameter larger than said shock-absorbing member compressed between the shock-absorbing and retaining members to absorb lateral shock, and said retainer member threaded to engage said shock-absorbing member above said resilient rings.

2. A shock-absorbing nose plug for instrument housings used in deep well exploration comprising a connector adapted to threadably engage the lower end of said housing; a lateral shock-absorbing member below said connector and threadably connected thereto; resilient means external of said lateral shock absorbing member to absorb shock; a pin centrally disposed in said lateral shock absorbing member, in longitudinal extension thereof, and free to move therein; a metallic nose piece fixed to the extended end of said pin; and resilient shock absorbing means concentrically disposed around said pin between the lateral shock absorbing member and said nose piece to absorb vertical shock.

3. A shock-absorbing tail plug for instrument housings adapted to be suspended by a wire line in well borehole exploration comprising a connector member and a shock-absorbing member longitudinally and concentrically apertured to receive said line and constructed to be detachably attachable to the upper end of said instrument housing, resilient means inside the shock-absorbing member disposed in said aperture to receive the end of said line and absorb vertical shocks therefrom and a plurality of lateral shock-absorbing resilient rings compressed between said connector and shock-absorbing member and of a diameter larger than the securing members.

RAOUL J. BETHANCOURT.

REFERENCES CITED

The following references are of record in the file of this patent:

UNITED STATES PATENTS

| Number | Name | Date |
| --- | --- | --- |
| 1,860,932 | Lamb | May 31, 1932 |
| 1,985,229 | Allen | Dec. 25, 1934 |
| 2,109,690 | Culbertson | Mar. 1, 1938 |
| 2,126,741 | Culbertson | Aug. 16, 1938 |
| 2,219,512 | Cooper et al. | Oct. 29, 1940 |
| 2,378,738 | Smith | June 19, 1945 |
| 2,425,869 | Dillon | Aug. 19, 1947 |